June 14, 1927.
E. C. WINTERS
VEHICLE WHEEL
Filed Feb. 24, 1926
1,632,527
3 Sheets-Sheet 1
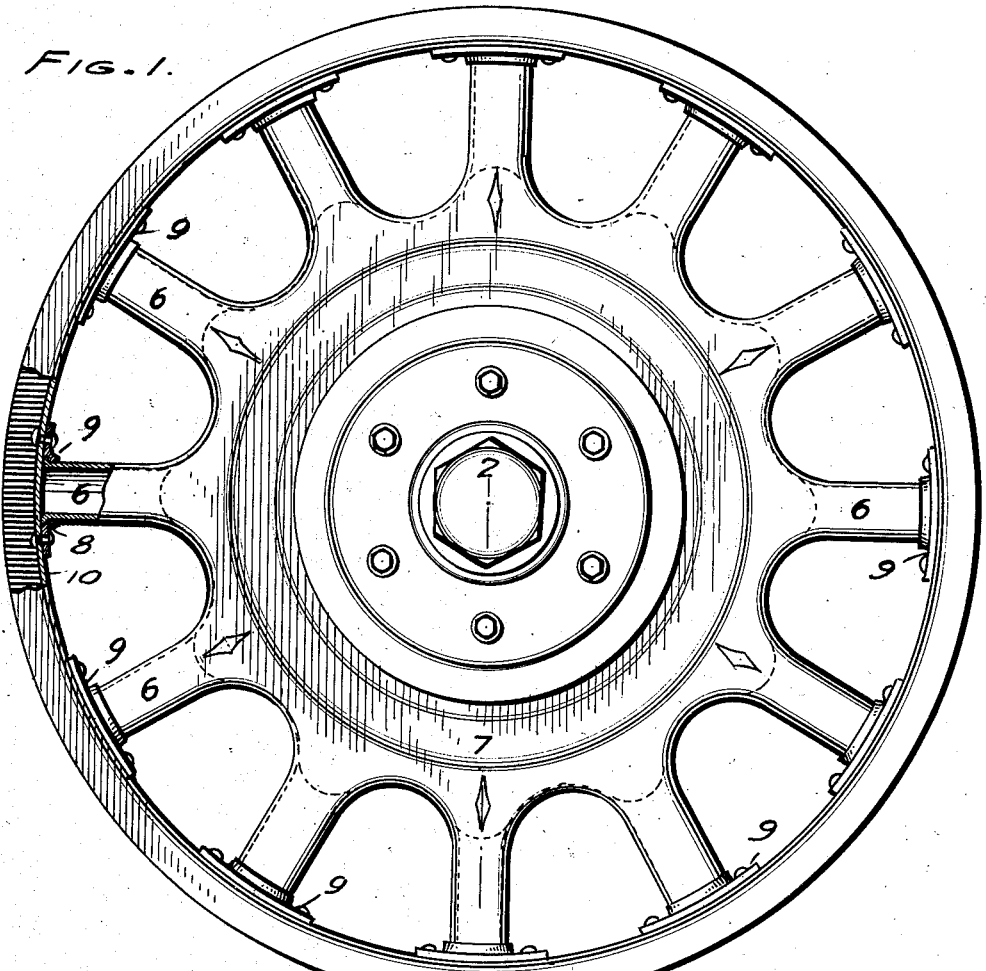
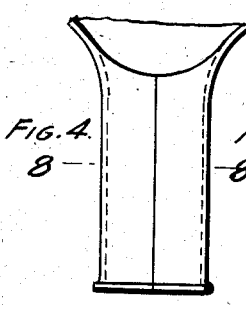 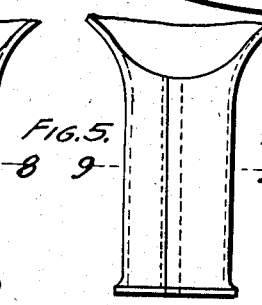 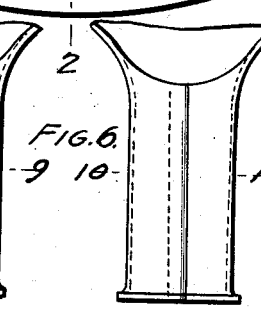 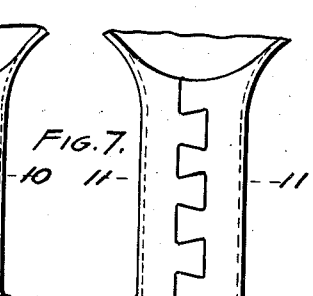
   
INVENTOR
EDWIN C. WINTERS
BY
ATTORNEYS

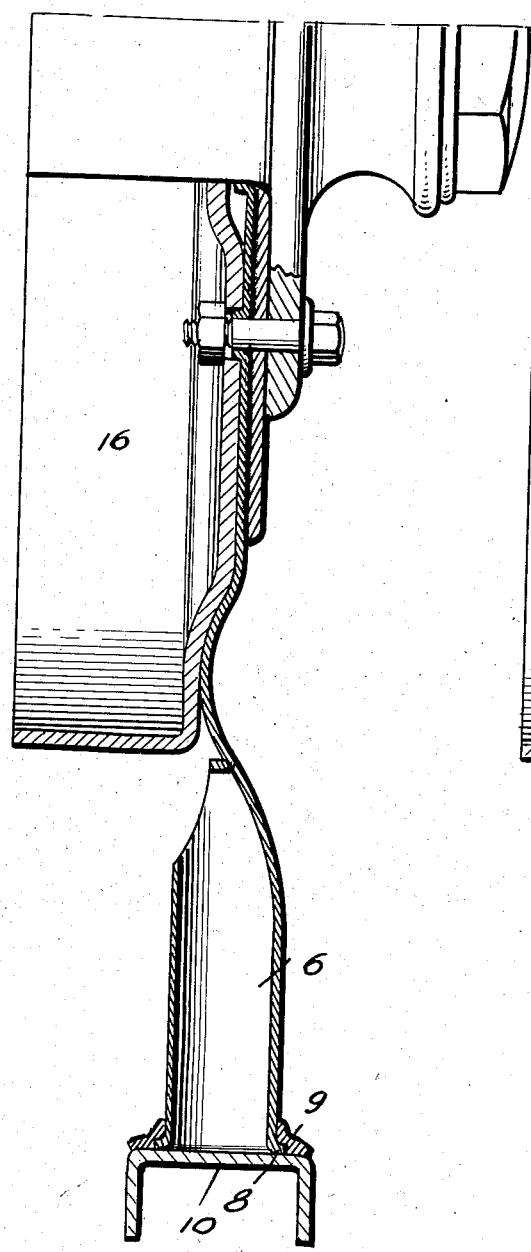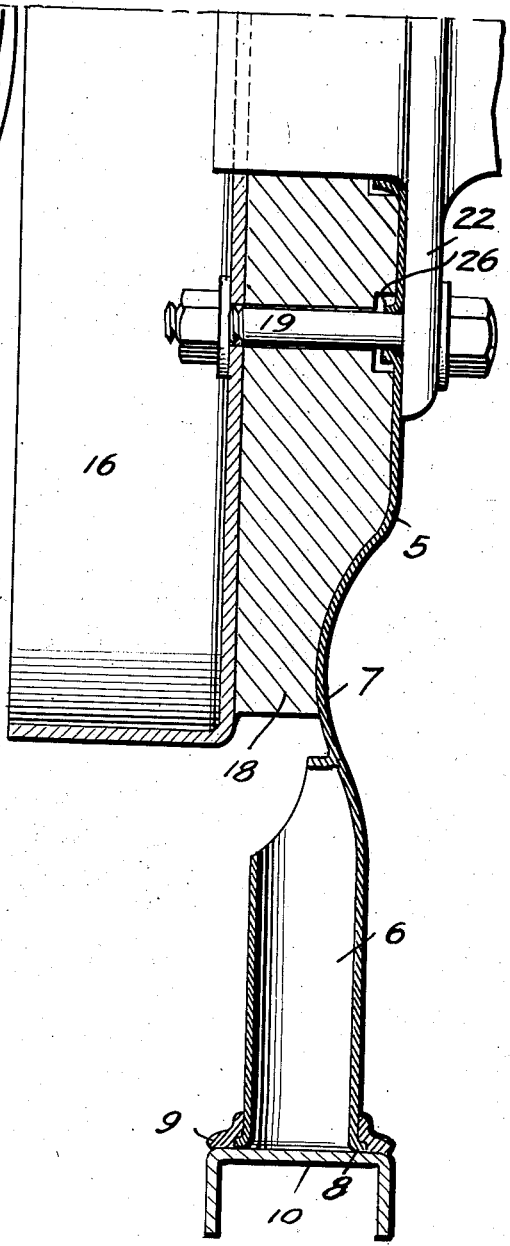

June 14, 1927.
E. C. WINTERS
1,632,527
VEHICLE WHEEL
Filed Feb. 24, 1926
3 Sheets-Sheet 3
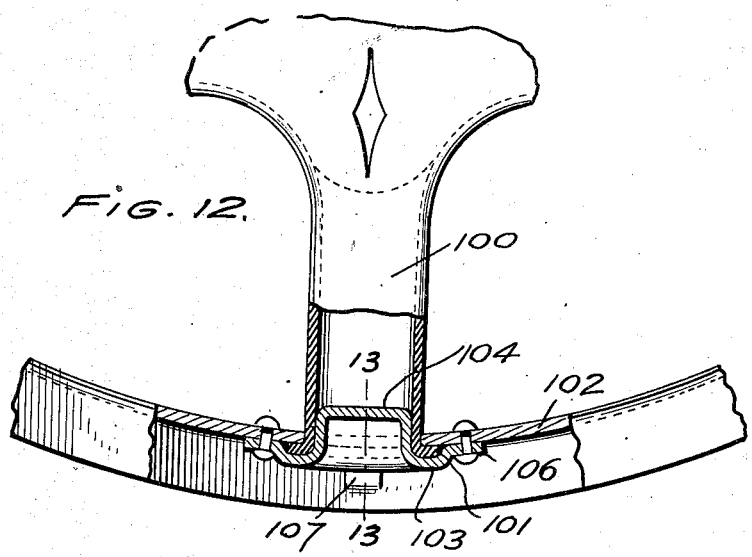
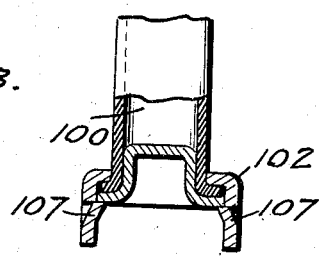
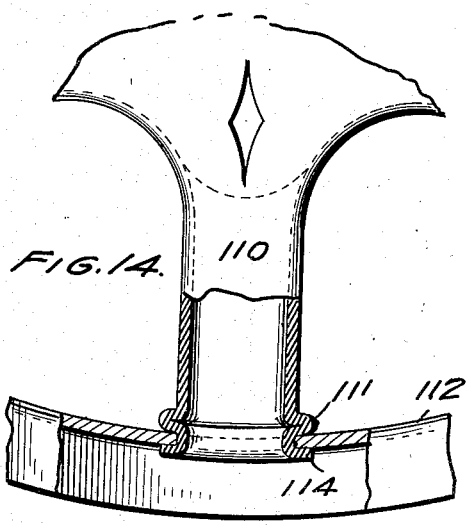
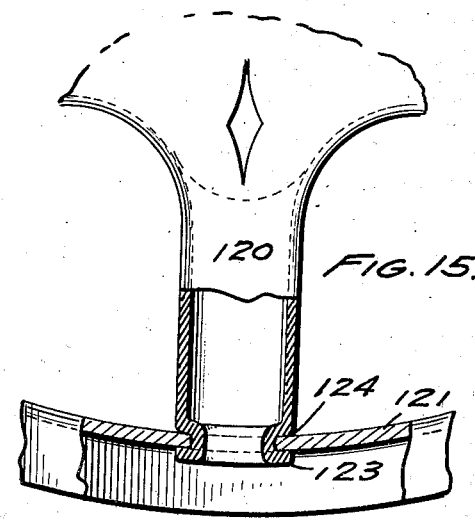
INVENTOR
EDWIN C. WINTERS
BY
ATTORNEYS Patented June 14, 1927.

1,632,527

UNITED STATES PATENT OFFICE.

EDWIN C. WINTERS, OF DETROIT, MICHIGAN.

VEHICLE WHEEL.

Application filed February 24, 1926. Serial No. 90,295.

This invention relates to wheels especially adapted for use on automobiles, although not in any sense restricted to such use.

Briefly stated, an important object of the invention is to provide a metallic wheel in which the peripheral portion is light so that the wheel in use will not have a fly-wheel effect as solid disk wheels have.

A further object of the invention is to provide a metallic wheel in which the outer portion of the blank of metal from which the wheel is formed is divided into a series of tubular spokes connected to a suitable felly by novel mounting plates which in addition to functioning as such constitute an effective means to avoid breaking of the seams in the tubular spokes.

A further object of the invention is to provide a wheel of the character specified which is of highly simplified construction, durable in use, and cheap to manufacture.

Other objects and advantages will be apparent during the course of the following description.

In the accompanying drawings forming a part of this application and in which like numerals are employed to designate like parts throughout the same, Figure 1 is a side elevation of the improved wheel, parts being shown in section;

Figure 2 is a detail sectional view through the wheel, a specially designed brake drum being connected thereto;

Figure 3 is a detail sectional view through the improved wheel, a conventional brake drum being attached thereto;

Figures 4, 5, 6 and 7 are side elevations of spokes having various types of seams, all of which may be employed in connection with the invention;

Figures 8, 9, 10 and 11 are sectional views taken on lines 8—8, 9—9, 10—10 and 11—11 of Figures 4, 5, 6 and 7, respectively;

Figure 12 is a detail sectional view through a wheel illustrating a modified means of attaching the spokes to the felly;

Figure 13 is a detail sectional view taken on line 13—13 of Figure 12;

Figure 14 is a fragmentary side elevation illustrating another manner of connecting the spokes to the felly, parts being shown in section;

Figure 15 is a fragmentary side elevation illustrating another modification of the invention, parts being shown in section.

In the drawings, the numeral 5 designates the hub portion of a wheel, which hub portion is formed from the same blank of metal from which the tubular spokes 6 are formed. The blank of metal from which the hub portion and the spokes are formed may be light as compared with solid disk wheels designed for similar service, and as shown in Figures 2 and 3 the hub portion is provided with an annular rib or corrugation 7 by means of which the construction is greatly strengthened and by means of which the spokes 6 are positioned properly with respect to the hub portion 5.

The single blank of metal from which the body of the improved wheel is formed has its outer portion divided into a number of separate sections or divisions pressed into tubular form and having their edges joined by any of the means illustrated in Figures 4 to 11, inclusive, or by any other means found desirable. Figures 2 and 3 illustrate that the outer portion of each spoke is provided with an external annular flange 8 received in a groove or rabbet in the inner side of a one-piece metallic mounting plate 9, the mounting plate being attached to the spoke and to a felly 10 by welding, rivets, or any other means found desirable. It will be seen that the mounting plates constitute a positive means for connecting the spokes to the felly and that the one-piece mounting plates aid in maintaining the seams in the spokes intact. In the manufacture of the wheel all of the metal at the peripheral portion of the single blank of metal from which the body of the wheel is formed is not employed in the formation of the spokes and consequently the peripheral portion of the wheel is light as compared with the well known solid disk wheels. This is accomplished without a sacrifice in strength.

If a conventional brake drum 16 is employed a filler block 18 is interposed between the hub portion of the wheel and the brake drum and is provided with a groove or recess adjacent the outer edge thereof to receive the annular corrugation 7. Bolts 19 are extended through the filler block 18, the brake drum, and the hub portion 5 to securely connect the brake drum to the wheel and by reference to Figure 3 it will be seen that the bolts also extend through the flange 22 of the hub of the wheel so as to attach the hub to the wheel. By further reference to Figure 3 it will be seen that the openings for the reception of the bolts 19 and in fact other bolt receiving openings in connection with this wheel are provided with drawn necks 26 to form bearings for the bolts.

A wheel constructed in accordance with this invention has all of the advantages of a metal wheel of disk formation and has the advantage of lightness and durability. Since it employs the separate spokes the wheel has many of the advantages of a wood wheel without the disadvantages of a wooden wheel.

The gage or thickness of metal used in the wheel will be regulated by the weight they are called upon to bear. For truck wheel construction two disk and spoked portions instead of one may be employed.

In the form of invention illustrated in Figures 12 and 13 the spokes are designated by the numeral 100 and have their outer terminal portions pressed outwardly to define annular attaching flanges 101 confined between the felly 102 and the offset flanges 103 of hollow cylindrical fastening heads 104. The cylindrical attaching or fastening heads 104 are provided at opposite sides thereof with ears 106 attached to the felly by rivets or other suitable devices. In carrying out the invention, the side flanges of the felly may be provided with inwardly struck ears 107 which engage the flanges of the cylindrical fastening members 104 to cooperate with the rivets in securing the cylindrical fastening members 104 firmly in place. This method of attaching the spokes to the felly is simple and reliable.

In the form of invention illustrated in Figure 14 the spoke is designated by the numeral 110 and is provided adjacent the outer portion thereof with an outwardly crimped rib 111 which engages the inner side of the felly 112 and cooperates with the outwardly flanged end 114 in securing the spoke to the felly. This method of attaching the spoke to the felly is durable and obviates the need of employing a separate fastening device such as the member 104.

In the form of invention illustrated in Figure 15 the spoke is designated by the numeral 120 and the outer portion of the same is reduced and extended through the felly 121 so that the outer terminal portion of the same may be pressed outwardly to define an annular flange 123 to cooperate with the shoulder 124 in securely attaching the spoke to the felly. The reduction in the external diameter of the outer portion of the spoke 120 defines the annular shoulder 124.

With reference to the foregoing description taken in connection with the accompanying drawings it will be apparent that the invention is capable of a wide variety of mechanical expressions and it is, therefore, to be understood that the form of invention herewith shown and described is to be taken merely as a preferred example of the same and that such minor changes in arrangement and construction of parts may be made as will remain within the spirit of the invention and the scope of what is claimed.

Having thus described the invention, what is claimed is:

1. A wheel formed from a single blank of metal having a hub portion and a plurality of separate portions arranged in tubular formation to define spokes, the outer portions of which are flared outwardly to define annular flanges, mounting plates associated with the outer portions of said spokes and engaging the flanges, and a felly engaged by said mounting plates.

2. A wheel formed from a blank of metal having the peripheral portion thereof formed with a plurality of separate portions arranged in tubular formation to define spokes, the outer portions of which are formed with external annular flanges, separate one-piece mounting plates receiving the outer portions of said spokes and engaging said flanges, and a felly engaged by the outer ends of said spokes and said mounting plates, said mounting plates constituting a means to lock the spokes to the felly.

3. A wheel comprising a blank of metal having an annular reinforcing corrugation dividing the blank of metal into a hub portion and a spoke section, the spoke section being divided into a plurality of seamed spokes, the outer portions of which are provided with external annular flanges, a felly engaged by said annular flanges, and separate one-piece mounting plates surrounding the spokes and connecting the flanges to said felly.

4. A metallic wheel comprising a blank of metal having an annular reinforcing corrugation dividing the blank of metal into a hub portion and a spoke section, the spoke section being formed with a plurality of seamed tubular spokes, the outer portions of which are formed with external annular flanges, a felly engaged by said flanges, and one-piece mounting plates having drawn necks receiving the outer portions of said spokes, said mounting plates being rigidly connected to said felly and locking the spokes to the felly.

5. A metallic wheel comprising a blank of metal having an annular reinforcing corrugation dividing the blank of metal into a hub portion and a spoke section, the spoke section being formed with a plurality of seamed tubular spokes, the outer portions of which are formed with external annular flanges, a felly engaged by said flanges, one-piece mounting plates having drawn necks receiving the outer portions of said spokes, said mounting plates being rigidly connected to said felly and locking the spokes to the felly, and a brake drum connected to the hub section.

6. A metallic wheel comprising a blank of metal having an annular reinforcing corrugation dividing the blank of metal into a hub portion and a spoke section, the spoke section being formed with a plurality of seamed tubular spokes, the outer portions of which are formed with external annular flanges, a felly engaged by said flanges, one-piece mounting plates having drawn necks receiving the outer portions of said spokes, said mounting plates being rigidly connected to said felly and locking the spokes to the felly, a brake drum connected to the hub portion, and a filler block confined between the brake drum and the hub portion and having a recess receiving said corrugation.

7. A metallic wheel comprising a blank of metal having an annular reinforcing corrugation dividing the blank of metal into a hub portion and a spoke section, the spoke section being formed with a plurality of seamed tubular spokes, the outer portions of which are formed with external annular flanges, a felly engaged by said flanges, one-piece mounting plates having drawn necks receiving the outer portions of said spokes, said mounting plates being rigidly connected to said felly and locking the spokes to the felly, a brake drum connected to the hub portion, and a filler block confined between the brake drum and the hub portion and having a recess receiving said corrugation, the seams in said spokes being held intact with the aid of said mounting plates.

8. The combination with a hub having a spoke, the outer portion of which is provided with an annular flange, of a felly having an opening receiving said spoke, and a cylindrical member received in the outer portion of said spoke and having a flange overlying said first-named flange and rigidly connected to said felly.

9. The combination with a hub having a spoke, the outer portion of which is provided with an annular flange, of a felly having an opening receiving said spoke, and a cylindrical member received in the outer portion of said spoke and having a flange overlying said first-named flange and rigidly connected to said felly, said felly being provided with sides having inwardly struck ears engaging said cylindrical member.

10. A wheel formed from a single blank of metal having a hub section and a plurality of separate portions arranged in tubular formation to define spokes, a felly, and means for connecting the spokes to said felly, said means retaining said spokes in tubular formation.

11. A metallic wheel comprising a blank of metal having an annular reinforcing corrugation dividing the blank of metal into a hub portion and a spoke section, the spoke section being formed with a plurality of seamed tubular spokes, a felly and mounting means for the spokes and felly, the seams in the spokes being held intact with the aid of said mounting means, a brake drum connected to the hub portion, and a filler block confined between the brake drum and the hub portion and having a recess receiving said corrugation.

In testimony whereof I affix my signature.

EDWIN C. WINTERS.